(12) United States Patent
Kawakami et al.

(10) Patent No.: US 7,772,822 B2
(45) Date of Patent: Aug. 10, 2010

(54) POWER SUPPLY APPARATUS

(75) Inventors: Yoshihito Kawakami, Kanagawa (JP);
Junji Ishiyama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 393 days.

(21) Appl. No.: 12/041,817

(22) Filed: Mar. 4, 2008

(65) Prior Publication Data
US 2008/0218134 A1    Sep. 11, 2008

(30) Foreign Application Priority Data
Mar. 8, 2007    (JP) .............................. 2007-058344

(51) Int. Cl.
*G05F 1/618*    (2006.01)

(52) U.S. Cl. ..................... 323/283; 323/271; 363/21.01; 361/118

(58) Field of Classification Search ......... 323/282–288, 323/271, 272, 280, 299, 315, 316; 363/21.18, 363/21.01; 361/111, 118, 88, 93.2, 98; 307/350, 307/360
See application file for complete search history.

(56) References Cited

U.S. PATENT DOCUMENTS

| | | | |
|---|---|---|---|
| 4,787,007 A * | 11/1988 | Matsumura et al. | 361/98 |
| 5,375,029 A * | 12/1994 | Fukunaga et al. | 361/101 |
| 5,912,552 A * | 6/1999 | Tateishi | 323/285 |
| 6,369,556 B1 * | 4/2002 | Ohshima | 323/282 |
| 6,984,810 B2 * | 1/2006 | Ishii | 219/492 |
| 7,102,339 B1 * | 9/2006 | Ferguson | 323/284 |
| 2007/0096781 A1 | 5/2007 | Ito | |
| 2007/0139982 A1 | 6/2007 | Ueno et al. | |
| 2007/0247124 A1 | 10/2007 | Mihashi | |

FOREIGN PATENT DOCUMENTS

| | | |
|---|---|---|
| JP | 2005-269838 | 9/2005 |
| JP | 2006-204022 | 8/2006 |

OTHER PUBLICATIONS

English language Abstract of JP 2005-269838.
English language Abstract of JP 2006-204022.

* cited by examiner

*Primary Examiner*—Rajnikant B Patel
(74) *Attorney, Agent, or Firm*—Greenblum & Bernstein, P.L.C.

(57) ABSTRACT

A power supply apparatus having a soft start function that enables a startup without any overshoot within an appropriate startup time regardless of whether the load is heavy or light. Even when output direct current voltage Vo has not yet risen upon startup, switch circuit (4) is turned ON within a count time of timer (7), and clamping circuit (5) clamps error signal (Ve) of error amplifier (2), so that an excessive signal is prevented from entering PWM circuit (6), and electric power supplied to load (13) is controlled. Consequently, supply power as the power supply apparatus is limited, and any inrush current can be prevented from being generated. By controlling the count time of timer (7) when this error signal is clamped, it is possible to realize a startup within an appropriate startup time without any overshoot.

4 Claims, 7 Drawing Sheets

1: REFERENCE VOLTAGE SOURCE
2: ERROR AMPLIFIER
4: SWITCH CIRCUIT
5: CLAMPING CIRCUIT
6: PWM CIRCUIT
7: TIMER
8: INPUT TERMINAL
9: SWITCHING TRANSISTOR
10: DIODE
11: INDUCTOR
12: CAPACITOR

POWER SUPPLY APPARATUS

CROSS REFERENCE TO RELATED APPLICATIONS

The disclosure of Japanese Patent Application No. 2007-058344, filed on Mar. 8, 2007 including the specification, drawings and abstract, is incorporated herein by reference in its entirety.

BACKGROUND OF THE INVENTION

1. Field of the Invention

The present invention relates to a power supply apparatus. More particularly, the present invention relates to a power supply apparatus that controls a direct current voltage inputted from an input power supply such as a battery and has a soft start function to limit the supply power upon startup when this direct current voltage is outputted.

2. Description of Related Art

There are schemes for a power supply apparatus such as a series regulator and switching regulator. What is common to both schemes for a power supply apparatus for supplying a stable output direct current voltage to a load is a configuration detecting and feeding back the output direct current voltage, and the supply power is increased when the output direct current voltage is lower than a target value, and the supply power is decreased when the output direct voltage is higher than the target value. For this reason, upon startup when the output direct voltage is low, the power supply apparatus increases the supply power to the limit of its capacity, and therefore an inrush current flows from the input power supply. Moreover, the supply power is decreased after the output direct current voltage exceeds the target value, and therefore an overshoot is generated in the output direct current voltage due to a supply of excessive electric power.

Such a technique used to control the input inrush current and the output overshoot upon startup is the soft start function which limits the supply power upon startup.

Patent Document 1 (Japanese Patent Application Laid-Open No. 2005-269838) discloses a power supply apparatus provided with a soft start function.

FIG. 1 is a circuit diagram showing the configuration of a power supply apparatus provided with the soft start function disclosed in Patent Document 1.

In FIG. 1, the power supply apparatus has reference voltage source 1, error amplifier 2, reference signal generation circuit 3, switch circuit 4, clamping circuit 5, PWM (Pulse Width Modulation) circuit 6, input direct current voltage Vin input terminal 8, switching transistor 9, diode 10, inductor 11 and capacitor 12.

Reference voltage source 1 generates reference voltage E0 which is a target of output direct voltage Vo of the power supply apparatus.

Error amplifier 2 compares output direct current voltage Vo with reference voltage E0 and outputs error signal Ve.

Reference signal generation circuit 3 generates a reference signal that increases/decreases at a predetermined frequency.

Switch circuit 4 is turned OFF when output direct current voltage Vo reaches a predetermined value.

Clamping circuit 5 is configured with a voltage source and generates clamping voltage Vc1.

PWM circuit 6 compares error signal Ve with the reference signal and outputs a drive pulse.

Above described switching transistor 9, diode 10, inductor 11 and capacitor 12 configure a voltage conversion section referred to as a "step-down converter." In this voltage conversion section, when switching transistor 9 repeats ON/OFF according to the drive pulse outputted from PWM circuit 6, input direct current voltage Vin is chopped, and is rectified by diode 10, and then is smoothed by inductor 11 and capacitor 12, and output direct current voltage Vo is supplied to load 13. Output direct current voltage Vo becomes higher when the rate (referred to as a "duty ratio") of an ON time in a switching cycle of switching transistor 9 is greater.

In the above described configuration, error signal Ve outputted from error amplifier 2 that compares output direct current voltage Vo with reference voltage E0 becomes large when output direct current voltage Vo is lower than reference voltage E0, and becomes small when output direct current voltage Vo is higher than reference voltage E0. Switch circuit 4 is OFF during normal operation, and PWM circuit 6 compares error signal Ve outputted from error amplifier 2 with the reference signal outputted from reference signal generation circuit 3. By this means, the pulse width of the pulse signal outputted from PWM circuit 6 becomes wider when error signal Ve is larger.

That is, when output direct current voltage Vo is lower than reference voltage E0, error signal Ve becomes large, the duty ratio of switching transistor 9 becomes greater, and output direct current voltage Vo becomes higher. On the contrary, when output direct current voltage Vo is higher than reference voltage E0, error signal Ve decreases, the duty ratio of switching transistor 9 becomes smaller, and output direct current voltage Vo decreases. According to such a feedback operation, output direct current voltage Vo is controlled so as to be equal to reference voltage E0.

The soft start operation upon startup applies clamping voltage Vc1 of clamping circuit 5 to the input signal of PWM circuit 6 through switch circuit 4. By this means, clamping voltage Vc1 which is actually lower than high potential error signal Ve is inputted to PWM circuit 6, the duty ratio of switching transistor 9 is reduced, so that the supply power is limited. Continuing this operation until output direct current voltage Vo becomes closer to a set voltage prevents any inrush current from being generated.

However, in the power supply apparatus having such a soft start function, the supply power may be exceeded or deficient depending on load 13 and the setting of clamping voltage Vc1 inputted to PWM circuit 6.

FIG. 2 shows a timing chart of the power supply apparatus having the soft start function upon startup.

As for the power supply apparatus in FIG. 1, an overshoot is generated in output direct current voltage Vo upon startup when load 13 is a light load. Moreover, when load 13 is a heavy load, there is a problem that starting up the apparatus requires a long time.

SUMMARY OF THE INVENTION

It is an object of the present invention to provide a power supply apparatus having a soft start function that enables a startup within an appropriate startup time without any overshoot regardless of whether a load is heavy or light.

According to an aspect of the invention, a power supply apparatus supplies an output direct current voltage converted from an input direct current voltage to a load, and has: an error amplifier that outputs an error signal according to an error between the output direct current voltage and a target value; a control section that adjusts power to be supplied to the load according to the error signal; a timer that counts a predetermined time from a startup; a first clamping circuit that clamps the voltage of the error signal so as not to exceed a first clamping voltage; and a switch circuit that applies the error signal to the first clamping circuit within the predetermined time.

DETAILED DESCRIPTION OF THE PREFERRED EMBODIMENT

Hereinafter, embodiments of the present invention will be explained more specifically with reference to the drawings.

Embodiment 1

Figure 1:
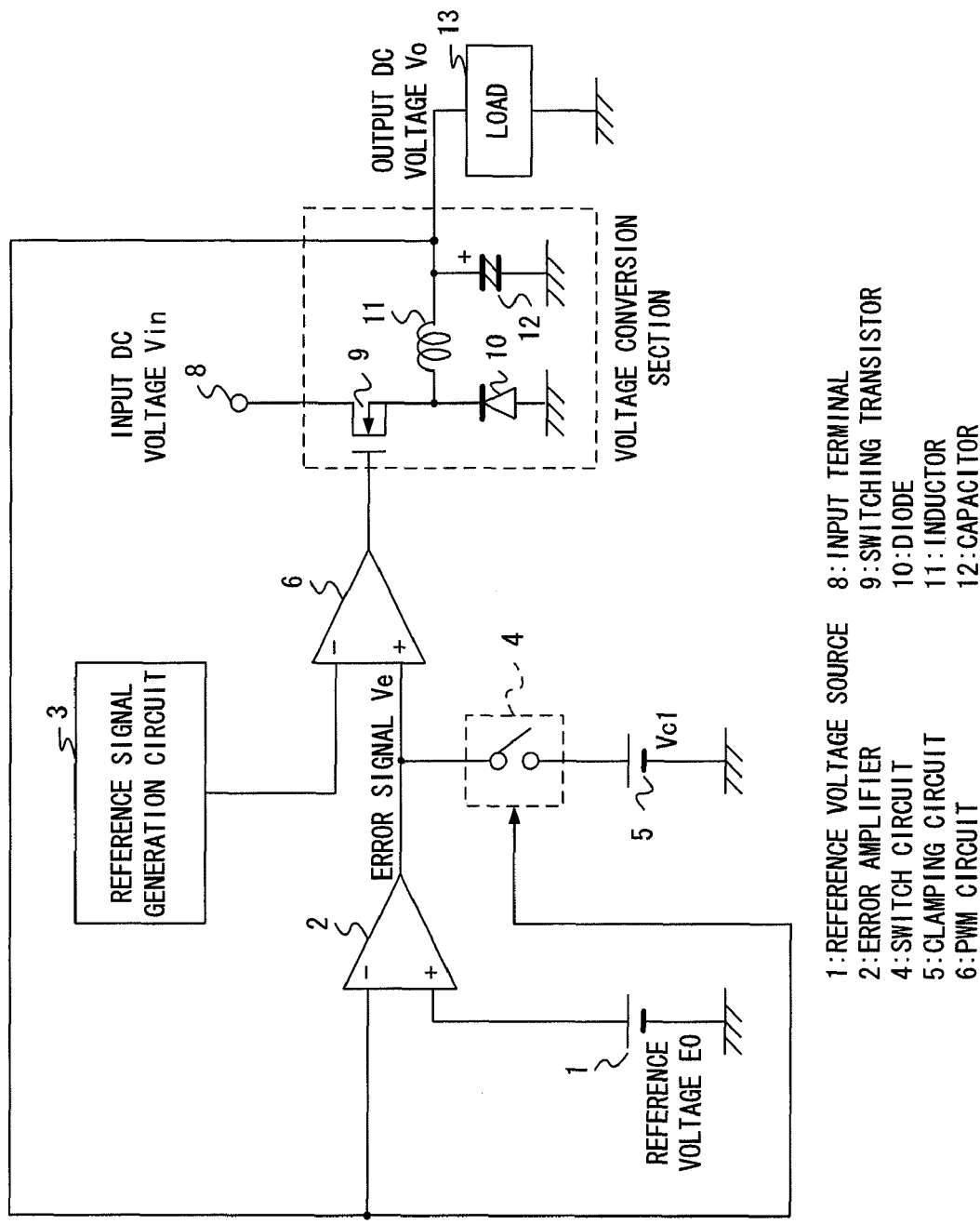
FIG. 1 is a circuit diagram showing the configuration of a conventional power supply apparatus.
Figure 2:
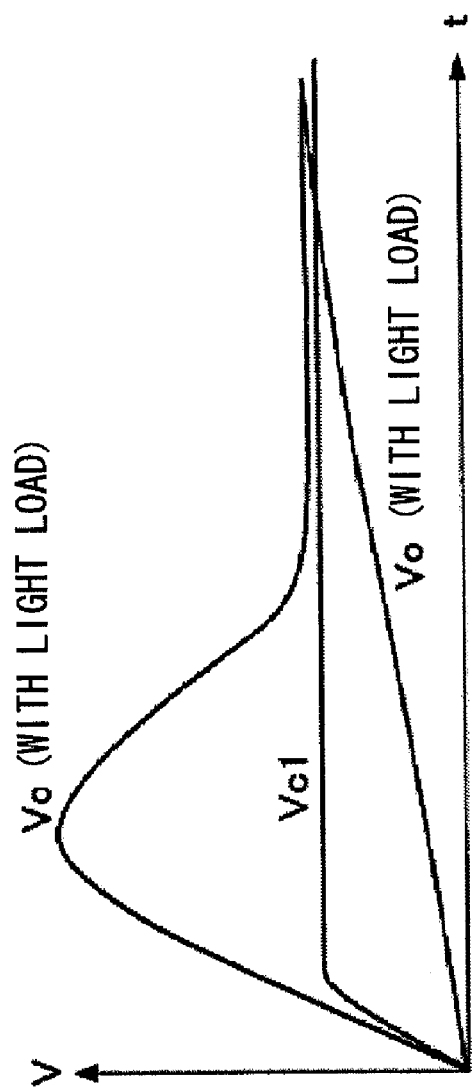
FIG. 2 is a timing chart of an input/output signal of the conventional power supply apparatus.
Figure 3:
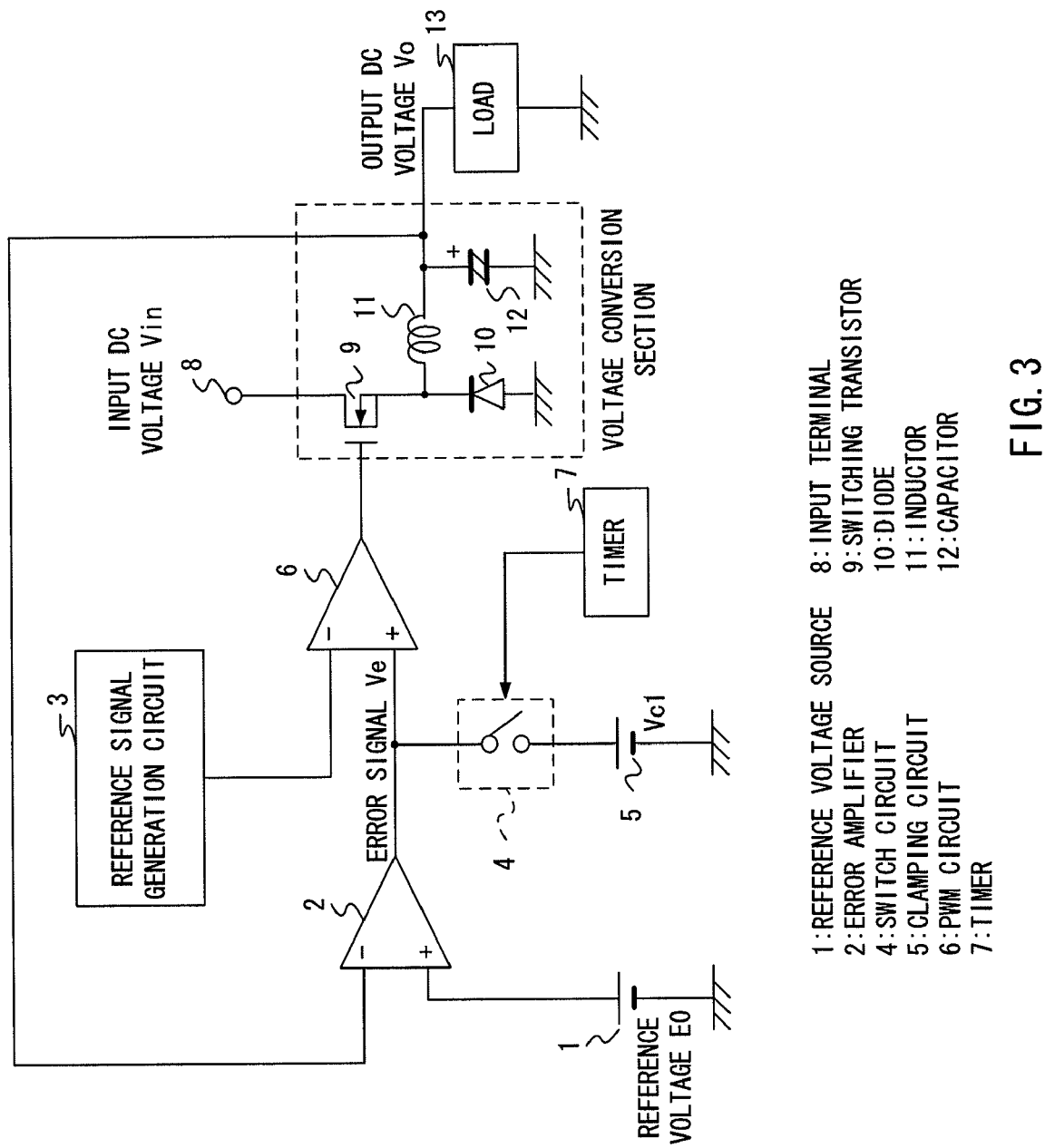
FIG. 3 is a circuit diagram showing the configuration of a power supply apparatus according to Embodiment 1 of the present invention.

FIG. 3 is a circuit diagram showing the configuration of a power supply apparatus according to Embodiment 1 of the present invention. Components having functions equivalent to the components shown in FIG. 1 will be assigned the same reference numerals, and the same reference numerals will also be applied to the following drawings.

In FIG. 3, the power supply apparatus has reference voltage source 1, error amplifier 2, reference signal generation circuit 3, switch circuit 4, clamping circuit 5, PWM circuit 6, timer 7, input direct current voltage input terminal 8, switching transistor 9, diode 10, inductor 11 and capacitor 12.

Reference voltage source 1 generates reference voltage E0 which is a target of output direct current voltage Vo of the power supply apparatus.

Error amplifier 2 compares output direct current voltage Vo with reference voltage E0 and outputs error signal Ve.

Reference signal generation circuit 3 generates a reference signal that increases/decreases at a predetermined frequency.

Switch circuit 4 is turned OFF when a predetermined time set by timer 7 is reached.

Clamping circuit 5 is configured with a voltage source and generates clamping voltage Vc1.

PWM circuit 6 compares error signal Ve with the reference signal and outputs a drive pulse.

Timer 7 is a timer that controls switch circuit 4 and turns ON switch circuit 4 within at least a time counted by timer 7 and clamps the output of error amplifier 2 regardless of error signal Ve.

Above described switching transistor 9, diode 10, inductor 11 and capacitor 12 configure a voltage conversion section, referred to as a "step-down converter," that connects diode 10 in parallel to a series circuit of inductor 11 and capacitor 12, and applies input direct current voltage Vin to diode 10 through switching transistor 9.

In the above described voltage conversion section, when switching transistor 9 repeats ON/OFF according to the drive pulse outputted from PWM circuit 6, input direct current voltage Vin is chopped, and is rectified by diode 10, and then is smoothed by inductor 11 and capacitor 12, and output direct current voltage Vo is supplied to load 13. Output direct current voltage Vo becomes higher when the rate (referred to as a "duty ratio") of an ON time in switching cycle of switching transistor 9 is greater.

Hereinafter, the operation of the power supply apparatus configured as described above will be explained.

In FIG. 3, error signal Ve outputted by error amplifier 2 that compares output direct current voltage Vo with reference voltage E0 becomes large when output direct current voltage Vo is lower than reference voltage E0, and becomes small when output direct current voltage Vo is higher than reference voltage E0. Switch circuit 4 is OFF during normal operation, and PWM circuit 6 compares error signal Ve outputted from error amplifier 2 with the reference signal outputted from reference signal generation circuit 3. By this means, the pulse width of the pulse signal outputted from PWM circuit 6 becomes wider when error signal Ve is larger.

That is, when output direct current voltage Vo is lower than reference voltage E0, error signal Ve becomes large, the duty ratio of switching transistor 9 becomes greater, and output direct current voltage Vo becomes higher. On the contrary, when output direct current voltage Vo is higher than reference voltage E0, error signal Ve becomes small, the duty ratio of switching transistor 9 becomes smaller, and output direct current voltage Vo decreases. According to such a feedback operation, output direct current voltage Vo is controlled so as to be equal to reference voltage E0.

Figure 4:
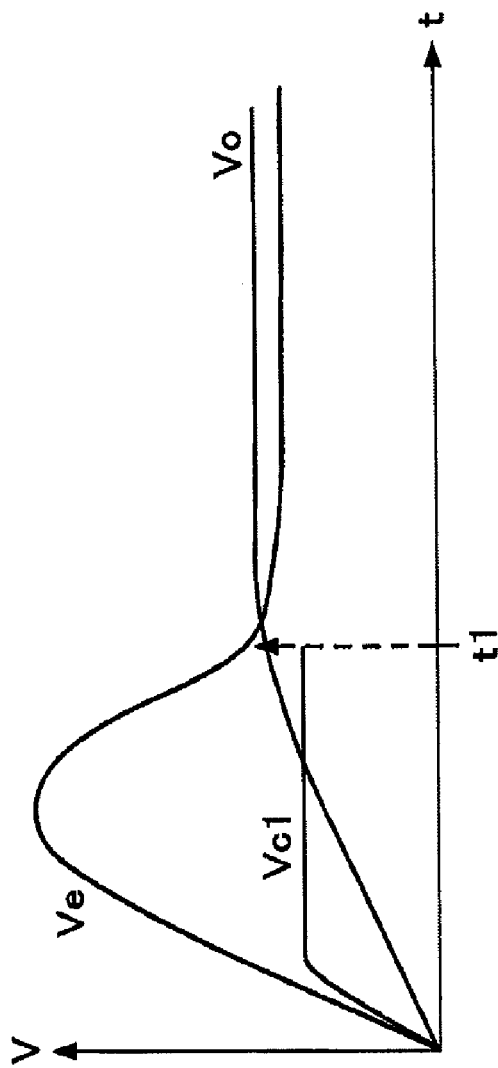
FIG. 4 is a timing chart of an input/output signal of the power supply apparatus with a light load according to Embodiment 1 of the present invention.
Figure 5:
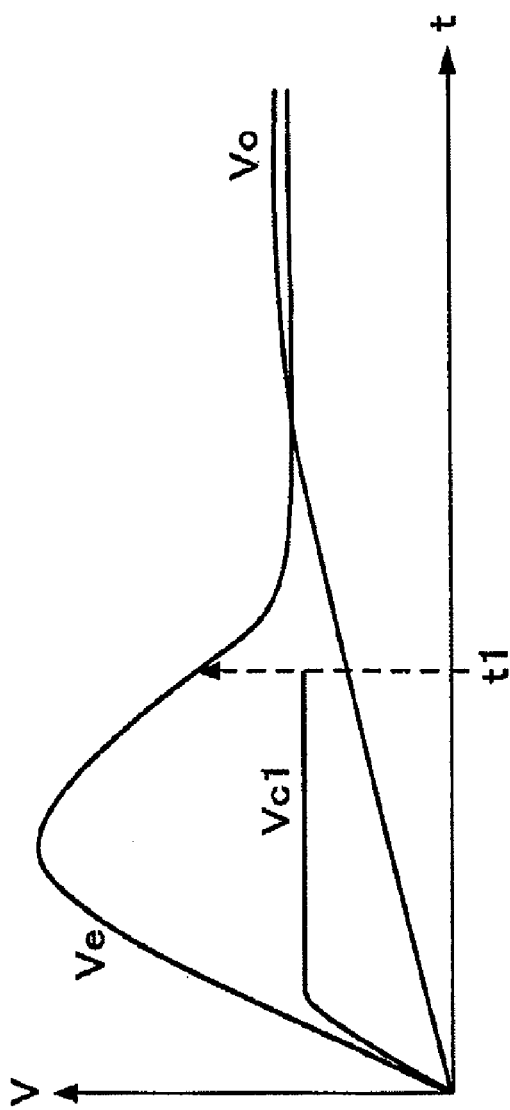
FIG. 5 is a timing chart of an input/output signal of the power supply apparatus with a heavy load according to Embodiment 1 of the present invention.

FIG. 4 and FIG. 5 show timing charts of respective sections of the power supply apparatus in FIG. 3 upon startup, FIG. 4 shows a case where load 13 is light, and FIG. 5 shows a case where load 13 is heavy.

When output direct current voltage Vo of the power supply apparatus has not yet risen upon startup, even if reference voltage source 1 rises early and error signal Ve outputted by error amplifier 2 becomes large, switch circuit 4 is ON within a time set by timer 7, and the clamping level of error signal Ve is clamped to clamping voltage Vc1. For this reason, an excessive signal is prevented from entering PWM circuit 6, the duty ratio of switching transistor 9 does not become greater, and supply power as the power supply apparatus is limited, so that it is possible to prevent any inrush current from being generated.

Furthermore, after the count time of timer 7, switch circuit 4 is turned OFF at time t1 in FIG. 4 and FIG. 5, and error signal Ve outputted from error amplifier 2 is separated from clamping circuit 5.

In FIG. 4, the load is light, and therefore output direct current voltage Vo becomes closer to reference voltage E0 within the count time of timer 7 when supply power is limited with error signal Ve clamped, and error signal Ve is already set to a low level at time t1. Even if switch circuit 4 is turned OFF, error signal Ve little fluctuates, and the state in that case is substantially the same as a state in which the supply power is limited, and therefore no overshoot is generated in output direct current voltage Vo.

On the other hand, with a heavy load in FIG. 5, output direct current voltage Vo does not reach reference voltage E0 within the count time of timer 7 when the supply power is limited with error signal Ve clamped, and error signal Ve is at a level higher than clamping voltage Vc1 at time t1. Therefore, when switch circuit 4 is turned OFF at time t1, error signal Ve becomes large by the difference from clamping voltage Vc1, the duty ratio of switching transistor 9 becomes greater, the supply power to load 13 increases, and output direct current voltage Vo also increases. However, even if the supply power increases, load 13 is heavy, and therefore no overshoot is generated.

As described above, the generation of the input inrush current and the output overshoot can be controlled regardless of whether load 13 is heavy or light.

Embodiment 2

Figure 6:
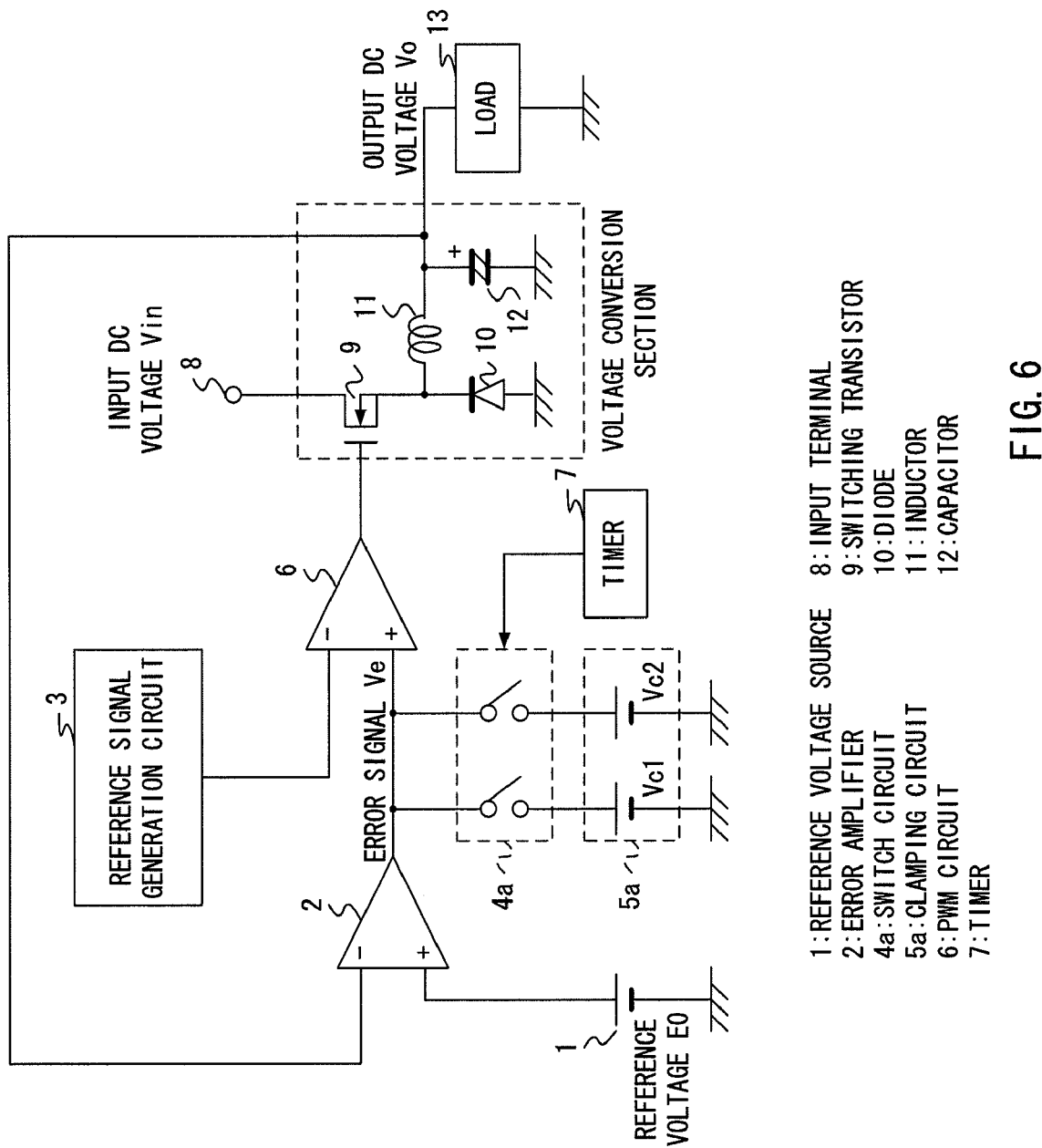
FIG. 6 is a circuit diagram showing the configuration of a power supply apparatus according to Embodiment 2 of the present invention.

FIG. 6 is a circuit diagram showing the configuration of a power supply apparatus according to Embodiment 2 of the present invention. The same components as those in FIG. 3 are assigned the same reference numerals.

In FIG. 6, the power supply apparatus has reference voltage source 1, error amplifier 2, reference signal generation circuit 3, switch circuit 4a, clamping circuit 5a, PWM circuit 6, timer 7, input direct current voltage input terminal 8, switching transistor 9, diodes 10, inductor 11 and capacitor 12.

Reference voltage source 1 generates reference voltage E0 which is a target of output direct current voltage Vo of the power supply apparatus.

Error amplifier 2 compares output direct current voltage Vo with reference voltage E0 and outputs error signal Ve.

Reference signal generation circuit 3 generates a reference signal that increases/decreases at a predetermined frequency.

Switch circuit 4a is turned OFF when a predetermined time set by timer 7 is reached.

Clamping circuit 5a is configured with a voltage source and generates clamping voltage Vc1 and clamping voltage Vc2 at different levels. However, clamping voltage Vc2 is assumed to be higher than clamping voltage Vc1.

PWM circuit 6 compares error signal Ve with the reference signal and outputs a drive pulse.

Timer 7 is a timer that controls switch circuit 4a, turns ON switch circuit 4a within at least a time counted by timer 7 and clamps the output of error amplifier 2 regardless of error signal Ve.

Above described switching transistor 9, diode 10, inductor 11 and capacitor 12 configure a voltage conversion section, referred to as a "step-down converter," that connects diode 10 in parallel to a series circuit of inductor 11 and capacitor 12, and applies input direct current voltage Vin to diode 10 through switching transistor 9.

In the above described voltage conversion section, when switching transistor 9 repeats ON/OFF according to the drive pulse outputted from PWM circuit 6, input direct current voltage Vin is chopped, and is rectified by diode 10, and then is smoothed by inductor 11 and capacitor 12, and output direct current voltage Vo is supplied to load 13. Output direct current voltage Vo becomes higher when the rate (referred to as a "duty ratio") of an ON time in a switching cycle of switching transistor 9 is greater.

Hereinafter, the operation of the power supply apparatus configured as described above will be explained.

Figure 7:
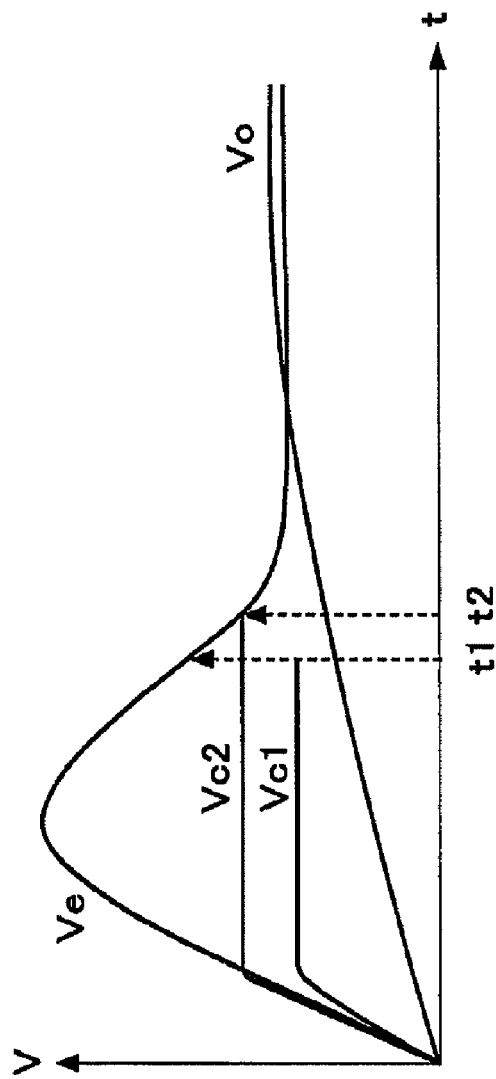
FIG. 7 is a timing chart of an input/output signal of the power supply apparatus according to Embodiment 2.

FIG. 7 shows a timing chart of respective sections of the power supply apparatus in FIG. 6 upon startup.

When output direct current voltage Vo of the power supply apparatus has not yet risen upon startup, even if reference voltage source 1 rises early and error signal Ve outputted from error amplifier 2 becomes large, switch circuit 4a is ON within a time set by timer 7, and error signal Ve is clamped to clamping voltage Vc1. For this reason, an excessive signal is prevented from entering PWM circuit 6, the duty ratio of switching transistor 9 does not become greater, supply power as the power supply apparatus is limited, so that it is possible to prevent any inrush current from being generated.

Furthermore, after the count time of timer 7, switch circuit 4a operates as follows at time t1 in FIG. 7 depending on the state of the load.

First, with a light load, output direct current voltage Vo is close to reference voltage E0, and switch circuit 4a is turned OFF in this case. At this time, error signal Ve is already at a low level at time t1. Even if switch circuit 4a is turned OFF, error signal Ve little fluctuates, and the state in that case is substantially the same as a state in which the supply power is limited, and therefore no overshoot is generated in output direct current voltage Vo.

Next, with a heavy load, when output direct current voltage Vo is much lower than reference voltage E0, switch circuit 4a is turned OFF. In this case, error signal Ve is at a level much higher than the clamping voltage at time t1. Therefore, when switch circuit 4a is turned OFF at time t1, error signal Ve becomes large by the difference from the clamping voltage, the duty ratio of switching transistor 9 becomes greater, the supply power to load 13 increases, and output direct current voltage Vo also increases. Even if the supply power increases, load 13 is heavy, and therefore no overshoot is generated. Moreover, an appropriate startup time is obtained.

Under a middle load which is neither a light load nor a heavy load, when output direct current voltage Vo is lower than reference voltage E0, if switch circuit 4a is turned OFF, error signal Ve is at a level higher than the clamping voltage at time t1, error signal Ve becomes large, the duty ratio of switching transistor 9 becomes greater, and the supply power to load 13 increases. At this time, load 13 is the middle load, and therefore a certain degree of overshoot may be generated.

When load 13 is the middle load between a light load and a heavy load, switch circuit 4a switches the clamping level of error signal Ve to clamping voltage Vc2. At this time, error signal Ve is at a level higher than clamping voltage Vc1 and clamping voltage Vc2 at time t1, and clamping voltage Vc2 is at a level higher than clamping voltage Vc1. Therefore, clamping voltage Vc1 changes to clamping voltage Vc2 for error signal Ve at time t1, the duty ratio of switching transistor 9 becomes greater, the supply power to load 13 increases somewhat, and output direct voltage Vo also increases. The supply power increases somewhat here, but the generation of any overshoot is suppressed by load 13. Moreover, the optimum startup time is obtained.

Here, whether the load is a light load, a middle load or a heavy load is decided based on, for example, the voltage applied to both ends of load 13 at time t1 as a state of the load. As a more specific example, output direct current voltage Vo applied to both ends of load 13 at time t1 is measured, and 90% or more of the target set voltage is decided to be a light load, 40% or less is decided to be a heavy load, and the rest is decided to be a middle load.

Moreover, as timing t2 at which clamping voltage Vc2 is turned OFF, clamping voltage Vc2 is turned OFF when the voltage level of error signal Ve becomes closer to clamping voltage Vc2. In this case, output direct current voltage Vo applied to both ends of load 13 is close to the set voltage value, error signal Ve little fluctuates and the generation of any overshoot is suppressed, so that it is possible to obtain a more optimum startup time.

As described above, by controlling the clamping voltage based on the state of load 13, it is possible to suppress the generation of any input inrush current and output overshoot and enable a startup within an appropriate startup time.

In the above described embodiments, clamping circuits 5 and 5a are not limited to voltage sources, and any configuration that can clamp error signal Ve may be employed.

Furthermore, although cases have been described with the above described embodiments where the step-down converter is used for the voltage conversion section, the present invention is not limited to this configuration. Various voltage conversion circuits such as a series regulator and a step-up converter can be applied to the configuration of the voltage conversion section. The present invention is applicable to any power supply apparatus using an error amplifier to control an output direct current voltage in normal operation regardless of the configuration of the voltage conversion section.

As described above, the present invention suppresses any input inrush current and output overshoot regardless of the state of a load and provides an advantage of enabling a stable startup at all times.

Therefore, the present invention is useful as an apparatus that suppresses any input inrush current and output overshoot regardless of the state of a load, enables a stable startup at all times, controls a direct voltage inputted from an input power supply such as a battery, and outputs this direct current voltage.

What is claimed is:

1. A power supply apparatus that supplies an output direct current voltage converted from an input direct current voltage to a load, the apparatus comprising:

an error amplifier that outputs an error signal according to an error between the output direct current voltage and a target value;

a control section that adjusts power to be supplied to the load according to the error signal;

a timer that counts a predetermined time from a startup;

a first clamping circuit that clamps the voltage of the error signal so as not to exceed a first clamping voltage; and a switch circuit that applies the error signal to the first clamping circuit within the predetermined time.

2. The power supply apparatus according to claim 1, wherein the predetermined time of the timer is within a startup time requiring the output direct current voltage.

3. The power supply apparatus according to claim 1, wherein the first clamping voltage is equal to or higher than a lower limit value of operation of the error signal.

4. The power supply apparatus according to claim 1, further comprising a second clamping circuit having a second clamping voltage higher than the first clamping voltage, wherein the switch circuit selects and switches whether to apply the error signal to the second clamping circuit or release the error signal according to the output direct current voltage after a lapse of the predetermined time of the timer.

* * * * *